United States Patent [19]

Akagi et al.

[11] Patent Number: 5,056,497

[45] Date of Patent: Oct. 15, 1991

[54] IGNITION CONTROL SYSTEM

[75] Inventors: Motonobu Akagi, Anjo; Nobuyuki Oota, Kariya; Yasutoshi Yamada, Chita, all of Japan

[73] Assignee: Aisin Seiki Kabushiki Kaisha, Kariya, Japan

[21] Appl. No.: 511,231

[22] Filed: Apr. 19, 1990

[30] Foreign Application Priority Data

Apr. 27, 1989 [JP] Japan .................................. 1-108558
Mar. 1, 1990 [JP] Japan .................................. 2-50324

[51] Int. Cl.[5] ........................... G01S 5/14; F02P 9/00; F02P 15/08

[52] U.S. Cl. .................................... 123/609; 123/637; 123/644

[58] Field of Search ............... 123/609, 610, 637, 643, 123/644

[56] References Cited

U.S. PATENT DOCUMENTS 3,945,362 3/1976 Neuman et al. ..................... 123/618
4,285,323 8/1981 Sugiura et al. ...................... 123/644
4,733,646 3/1988 Iwasaki .............................. 123/597
4,773,380 9/1988 Narita et al. ........................ 123/644

FOREIGN PATENT DOCUMENTS 3124423 12/1982 Fed. Rep. of Germany ...... 123/637

*Primary Examiner*—Tony M. Argenbright
*Assistant Examiner*—Robert E. Mates
*Attorney, Agent, or Firm*—Oblon, Spivak, McClelland, Maier & Neustadt

[57] ABSTRACT

An ignition system for generating multiple ignitions during a spark interval of an engine cylinder. For controlling an energy of each one of the multiple ignitions, a ramp signal which linearly rises from an initial peak value of a primary charge current for each one of the multiple ignitions of a primary winding of the ignition coil is compared with a preset value and a charge of the primary winding for each one of the multiple ignitions is stopped when the ramp signal exceeds the preset value. After a predetermined time, a primary charge current is supplied again to the primary winding until the ramp signal exceeds the preset value.

2 Claims, 6 Drawing Sheets

IGNITION CONTROL SYSTEM

FIELD OF THE INVENTION

The invention relates to an ignition control system for an internal combustion engine, and in particular, to an ignition control system which produces a plurality of spark discharges within a preset ignition period per cycle.

PRIOR ART

Recently, an improved ignition capability with a higher efficiency and at a higher power is required of an ignition system for a high performance automobile engine. To satisfy such requirement, there is proposed an ignition system as shown in FIG. 4, which is disclosed, for example, in Japanese Laid-Open Patent Application No. 58,430/1975 (or U.S. patent application Ser. No. 397,766 filed Sept. 17, 1973 and No. 421,579 filed Dec. 4, 1973) and in an article "Programmable Energy Ignition System For Engine Optimization" by Richard W. Johnston et al. in SAE Technical Paper Serial No. 750,348 (1975).

An ignition system shown in FIG. 4 is an improvement over a fully transistorized ignition system of induction discharge type, and comprises an ignition coil 110 including a primary coil 111 and a secondary coil 112, a distributor 120, a switching transistor 130 connected in a line joining the primary coil 111 to the ground, and a drive circuit 140 which drives the switching transistor 130 and the like.

The drive circuit 140 includes a reluctor 141, a pickup coil 142, a waveform shaper circuit 143, an arc duration control circuit 144, a comparator 145, an off time control circuit 146 and a drive gate 147.

The reluctor 141 has eight magnetic poles, and is fixedly mounted on a rotor shaft of the distributor 120 which is driven for rotation by a crank shaft of the engine. The pickup coil 142 is disposed close to the reluctor 141 for detecting the passage of each magnetic pole, thus developing an electromotive force corresponding to a change in the magnetic flux linkage caused by the rotation of the reluctor 141. The electromotive force is shaped in the waveform shaper 143 to a pulse which triggers the following arc duration control circuit 144. Here, the arc duration control circuit 144 comprises a monostable multivibrator, delivering an arc duration pulse a having its H level for about 75 msec to one input of the drive gate 147.

On the other hand, the comparator 145 is effective to compare a terminal voltage across a shunt resistor R connected between the emitter of the power transistor 130 and the ground against a reference potential Ref. When the former is higher, it delivers an L level to the off time control circuit 146 while it delivers an H level when the latter is higher. The off time control circuit 146 comprises a monostable multivibrator, and is triggered by a positive edge (a rising edge as it changes from its L to its H level) at the output from the comparator 145, thus delivering an off time control pulse b having an L level for a short time interval (which is short enough compared to 75 msec). The off time control pulse b is applied to the other input of the drive gate 147.

The drive gate 147 comprises an AND gate, and delivers a drive pulse of H level which turns the switching transistor 130 on only when both the arc duratin pulse a and the off time control pulse b both assume H level.

Reference is now made to FIG. 5.

When the arc duration pulse a assumes its L level, the drive gate 147 delivers a drive pulse of L level which renders the switching transistor 130 non-conductive, and accordingly, the current flow d through the primary coil 111 is equal to 0 while the off time control pulse b assumes its H level.

If the pickup coil 142 detects one of the magnetic poles on the reluctor 141 under this condition and operates through the waveform shaper 143 to trigger the arc duration control circuit 144, the arc duration pulse a changes to its H level, whereupon the drive gate 147 causes the drive pulse to be switched to its H level, thus turning the switching transistor 130 on. Accordingly, the current d which passes through the primary coil 111 increases gradually, and the terminal voltage across the shunt transistor R rises. When the terminal voltage becomes equal to the reference potential Ref which corresponds to a current threshold Lr of the primary coil 111, an output from the comparator 145 changes to its H level triggering the off time control circuit 146, whereby the off time control pulse b switches to its L level. Accordingly, the drive gate 147 switches the drive pulse to its L level, thus turning the switching transistor 130 off.

When the switching transistor 130 is turned off, the energy which has been accumulated in the primary coil 111 to that point in time will be momentarily transmitted to the secondary coil 112, inducing a high voltage thereacross (e: a negative voltage being developed depending on the direction of winding). The resulting voltage is applied to a spark plug SP1 which is selected by the distributor 120, causing a breakdown of the spark plug SP1 to produce a spark discharge.

Subsequently, when an off time passes and the control circuit 146 again switches the off time control pulse to its H level again, the switching transistor 130 is turned on again in the similar manner as mentioned above, thus charging the primary coil 111. However, since the atmosphere within a cylinder associated with the spark plug SP1 has been turned into a plasma as a result of the spark discharge, the transformer action of the ignition coil 110 provides a boosted secondary voltage, which causes a spark discharge to occur in the reverse direction.

Subsequently, what has been mentioned above is repeated as long as the arc duration pulse a is at its H level.

Stated differently, in this ignition system, spark discharges are repeated in the positive and negative direction during a period which is determined by the arc duration control circuit 146 (multiple ignition), and the spark energy is maintained as shown at g in FIG. 6, producing an enhanced ignition effect.

Also disclosed in Japanese Laid-Open Patent Application No. 28,871/1982 is an ignition system which excites a plurality of spark discharges (multiple ignition) during an ignition period.

Additionally, Japanese Laid-Open Patent Application No. 28,871/1982 discloses an ignition system in which a primary and a secondary current through an ignition coil are detected, a charging ceases (discharge is initiated) when the primary current reaches a preset threshold $V_{1th}$ and a charging is initiated (discharge ceases) when the actual current flow through the secondary winding decreases to a preset threshold $V_{2th}$.

As shown in these conventional examples, the primary current through the ignition coil or the charging current for the ignition coil at each repetition of the multiple ignition rises in a pulsating manner, so that under a condition in which a peak of the charging current is located close to a preset threshold Ref, a small variation in the magnitude of the charging current will result in a greater variation in the charging period t (the period during which the primary coil is energized), causing a greater variation in the degree to which the primary coil is charged as shown in FIG. 6. Specifically, during the repetition of the multiple ignition (repeated charging/discharge of the primary coil), considering a charging current Ip1 shown in FIG. 6, its peak is slightly below the preset threshold Ref, so that the charging period will be longer to $t_1$, but considering a charging current Ip1a which is slightly less than Ip1, its peak which becomes coincident with the preset threshold Ref allows the charging periods to be substantially reduced to $t_{1a}$.

As a consequence, assuming, for example, that the peak of the i-th charging current (Ip1) is slightly less than the preset threshold Ref to result in an elongated i-th charging period (Ip1), the residue of the charging energy which remains after the next discharge period will be high, so that the (i+1)-th charging current (for example, Ip2) through the primary coil will begin to rise early, whereby the peak of this charging current will sufficiently exceed the preset threshold Ref, resulting in a reduced (i+1)-th charging period ($t_2$). This reduces the residue of the charging energy subsequent to the next following discharge period, whereby the rising of (i+2)-th charging current (Ip1) through the primary coil will be retarded, and since its peak will be located slightly below the preset threshold Ref, (i+3)-th charging period (Ip1) will be longer, which in turn leaves an increased residue of the charged energy subsequent to the following discharge period. Such phenomenon results in a large variation in the charging period t, and a disturbance in the period of the multiple ignition, with the discharge energy greatly changing from discharge to discharge. Such variation leads to a reduced ignition efficiency (ignition rate/spark energy dissipated).

Additionally, with the technology of Japanese Laid-Open Patent Application No. 28,871/1982 mentioned above, when the secondary current (spark current) reduces to a preset value, the charging of the primary coil is then initiated, so that the discharge period (the period during which a spark discharge occurs) varies in interlocked relationship with the length of the charging period, and when the charging period varies greatly in a manner mentioned above, the discharge period also varies greatly, further causing a greater variation in the period of the multiple ignition and the discharge energy per discharge. In addition, the detection of the secondary current through the ignition coil or the discharge current passing through the secondary winding will be difficult to implement since this represents the detection of a discharge current in a high voltage circuit.

SUMMARY OF THE INVENTION

It is an object of the invention to improve the ignition efficiency.

In accordance with the invention, the above object is accomplished by providing an ignition control system comprising switching means (91) for supplying/interrupting a current through a primary winding of an ignition coil (IG1); supply command means (81, 82) for providing a conduction signal (c=L) to the switching means (91) as long as an ignition timing signal (a) at its supply command level (H) and in the absence of an interrupt command signal which will be described later and for providing an interrupt signal (c=H) to the switching means (91) in response to the ignition timing signal (a) being at its interrupt command level (A) and the interrupt command signal which will be described later; primary current detecting means (20) for detecting a current which passes through the primary winding; peak hold means (30) for detecting the peak value of the detected primary current; peak value detection command means (70) for commanding the peak hold means (30) to detect the peak value for a given time interval (Tc) after the conduction signal (c=L) has been developed; ramp signal generating means (40) for generating an electrical signal which rises linearly from a base point defined by the peak value held in the peak hold means (30); compare means (50) for producing an interrupt timing signal when the linearly rising electrical signal reaches a preset level (Ref); and interrupt interval presetting means (60) for providing an interrupt command signal which commands the interruption of a preset time interval (Ts) to the supply command means (81, 82) in response to the interrupt timing signal.

When the ignition timing signal (a) assumes its supply command level (H), the supply command means (81, 82) provides a conduction signal (c=L) to the switching means (91), whereby the switching means (91) is rendered conductive to supply a current through the primary coil of the ignition coil (IG1). On the other hand, the peak value detection command means (70) commands the peak hold means (30) to detect the peak value for a given time interval (Tc) after the conduction signal (c=L) has been developed, and the peak hold means (30) detects and holds the peak value of the primary current which is detected by the primary current detecting means (20). The ramp signal generating means (40) generates an electrical signal which linearly rises from a base point defined by the peak value, and the compare means (50) produces an interrupt timing signal when the linearly rising electrical signal reaches the preset level (Ref). The interrupt interval presetting means (60) responds to the interrupt timing signal to provide the interrupt command signal which commands the interruption of a preset time interval (Ts) to the supply command means (81, 82). The supply command means (81, 82) provides an interrupt signal (c=H) to the switching means (91) in response to the interrupt command signal. Accordingly, the switching means (91) interrupts a current flow through the primary coil during the time interval (Ts) after the electrical signal which generally rises from the base point defined by the peak value has reached the preset level (Ref), and a spark current passes through the secondary coil of the ignition coil during such time interval.

When the preset time interval (Ts) passes and the interrupt signal ceases and when the ignition timing signal (a) is at its supply command level (H), the supply command means (81, 82) provides the conduction signal (c=L) to the switching means (91). In this manner, the charging and the discharge (spark) of the ignition coil (IG1) are repeated alternately as long as the ignition timing signal (a) is at its supply command level (H).

When the energization of the primary coil of the ignition coil supply (IG1) is initiated, the energization starts at a level corresponding to the residual current from the previous discharge and the peak value of the pulsation of the current (charging current) which passes through the primary coil during a given time interval (Tc) thereafter is held by the sample hold means (30). There is no pulsation in the electrical signal which linearly rises from the base point defined by the peak value, and this shifts to a high or low side depending on the residual current from the previous discharge. Since the peak value is proportional to the residual current, the time interval (t) from the conduction to the interruption of the switching means (91) will have a value which is proportional to the residual current, avoiding any variation therein as experienced in the prior art. Rather it will be stabilized to a substantially fixed period which corresponds to the preset level (Ref) and the preset time interval (Ts), allowing the energy of each spark in the multiple ignition to be stabilized to substantially a fixed value. Accordingly, the ignition efficiency (ignition rate/spark energy dissipated) may be maintained high by a suitable choice of the preset level (Ref) and the preset time interval (Ts).

The other objects and features of the invention will become apparent from the following description of an embodiment thereof with reference to the drawings.

DESCRIPTION OF EMBODIMENTS

Figure 1:
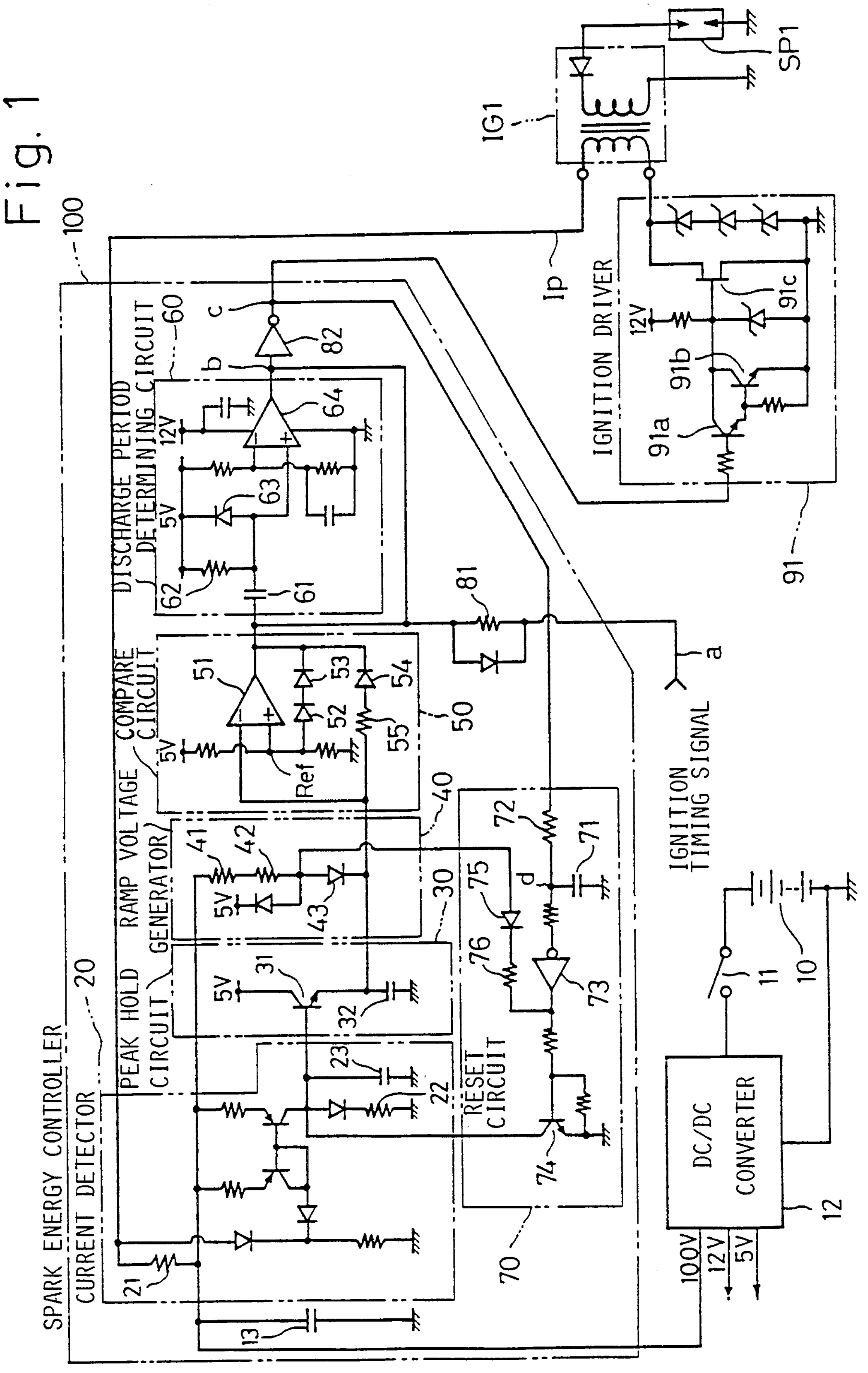
FIG. 1 is a circuit diagram of an electrical circuit according to one embodiment of the invention.

FIG. 1 shows one embodiment of the invention. In this embodiment, when an ignition switch 11 of a vehicle is closed, an onboard battery 10 is connected to a DC/DC converter 12, which produces voltages of 5 V, 12 V and 100 V, which are supplied to various parts of the electrical circuit shown in FIG. 1. A capacitor 13 is charged to a voltage of 100 V. Connected to the capacitor 13 is one terminal of a primary coil of an ignition coil IG1 through a resistor 21 having a low resistance and which is used to detect a current value, and the other terminal of the primary coil is connected to FET91c of an ignition driver 91. When FET91c conducts, the other terminal of the primary coil will be connected to the ground, representing the body of the apparatus, allowing a current flow through the primary coil.

Figure 2:
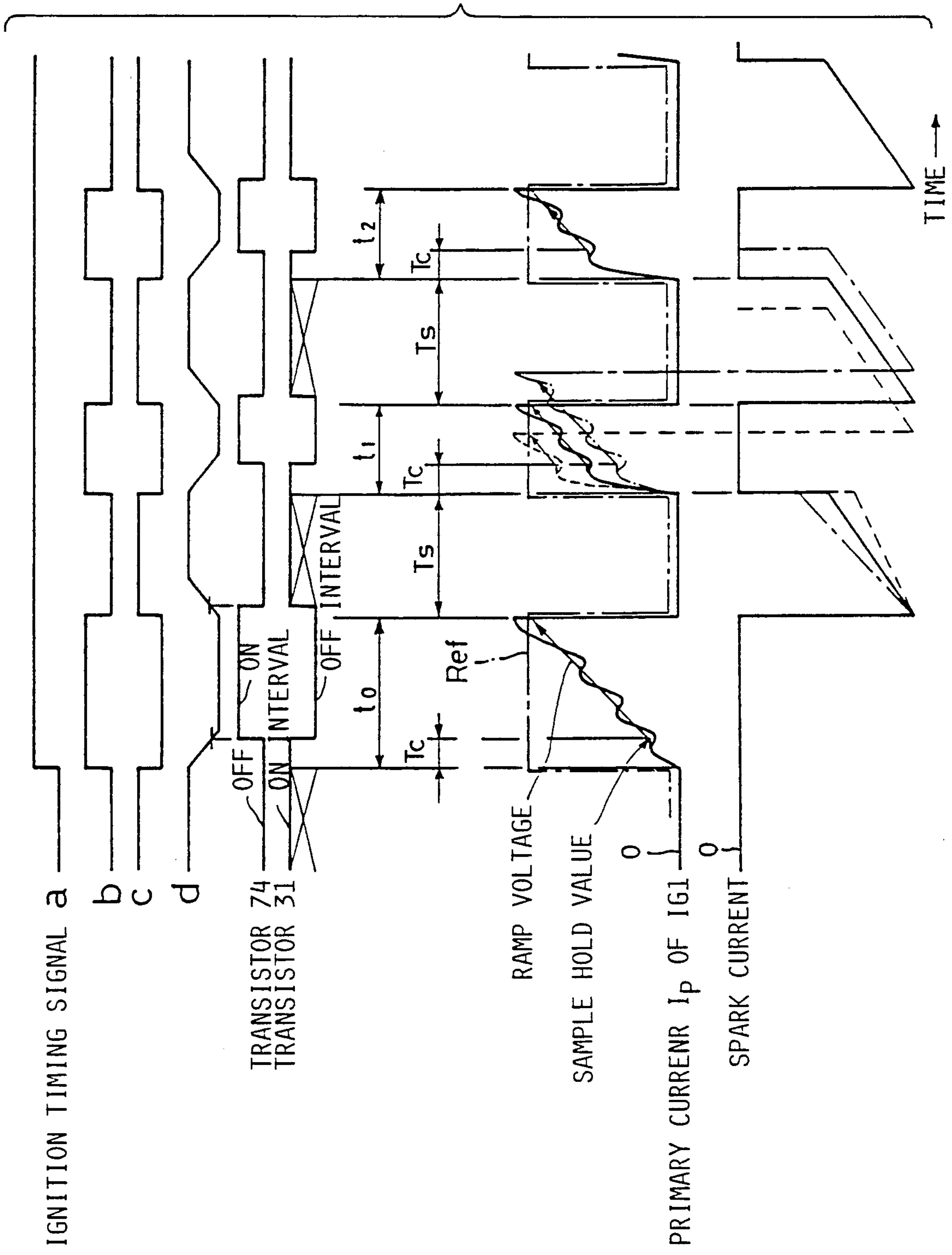
FIGS. 2(*a–d*) are a timing chart showing changes in electrical signals appearing at various parts in the electrical circuit shown in FIG. 1 in a time sequence.

FIG. 2 shows changes occurring in electrical signals at various points in the electrical circuit shown in FIG. 1 in a time sequence. Reference should be made to FIG. 2 in the description to follow for the timings at which signals are developed as well as their changes.

Returning to FIG. 1, when an ignition timing signal a assumes a high level H which commands an ignition, it is applied through a resistor 81 to an inverter 82, an output c of which will be inverted to a low level L which commands a conduction. In response thereto, transistors 91*a*, 91*b* in the ignition driver 91 are turned off, applying a high level H to FET91c, which then conducts to allow a current to pass through the primary coil of the ignition coil IG1. A voltage which is proportional to the current value is developed across the terminals of the resistor 21, and since a transistor 74 in a reset circuit 70 is off, a voltage which is proportional to this voltage will appear across a resistor 22 and a capacitor 23 in a current detector circuit 20.

A current value signal or a voltage which is proportional to the current value (primary coil current) passing through the resistor 21 is applied to the base of a transistor 31 in a peak hold circuit 30, and a potential across a capacitor 32 will rise to a voltage which is proportional to such voltage. In other words, the potential of the capacitor 32 rises in proportion to the primary coil current. Incidentally, as long as the capacitor 32 is being charged in this manner, the capacitor 32 maintains its maximum potential which is attained and no reduction in its potential occurs if the charging current happens to be reduced by pulsation.

On the other hand, when a signal c to the ignition driver 91 assumes its low level L which commands conduction, a capacitor 71 in the reset circuit 70 begins to discharge to the output end (low level L) of the inverter 82 through a resistor 72, but a resulting reduction in the potential of the capacitor 71 will be relatively slow, and the potential of the capacitor 71 will be sufficiently reduced to cause the output of an inverter 73 to invert from L to H to thereby render the transistor 74 conductive at a time interval Tc after the signal c has been switched from H to L.

During the time interval Tc after the switching of the signal c from H to L (the initiation of energization of the primary coil), it will be seen that within the reset circuit 72, the output of the inverter 73 is at L, whereby the transistor 74 is off, and accordingly the voltage proportional to the primary coil current will be applied to the peak hold circuit 30, allowing the capacitor 32 to be charged to a voltage which is proportional to the primary coil current. Incidentally, if there is a pulsating peak in the primary coil current, the capacitor 32 will not discharge at this time, and accordingly the capacitor 32 maintains the peak voltage. Since the output of the inverter 73 in the reset circuit 70 is at L, the anode of a diode 43 in a ramp voltage generator 40 will be at L through a diode 75 and a resistor 76 in the reset circuit 72, thus preventing the capacitor 32 from being charged by the ramp voltage generator 40. In other words, the peak value of the primary coil current will be detected and held by the capacitor 32.

When the time interval Tc passes, the output of the inverter 73 in the reset circuit 70 is at H, rendering the transistor 74 conductive. This turns a transistor 31 in the peak hold circuit 30 off, whereby a potential rise of the capacitor 32 which occurred in a manner corresponding to the current value in the current detector circuit 20 ceases. Thus, the peak hold circuit 30 ceases to detect the peak, and holds the value which has been detected to that point in time.

On the other hand, when the output of the inverter 73 in the reset circuit 70 becomes H, the anode of the diode 43 in the ramp voltage generator 40 will be separated from L, and the capacitor 32 will be connected to 100 V line through a series circuit including resistors 41, 42 and diode 43, whereby the capacitor 32 in the peak hold circuit 30 will be charged with a constant current value which corresponds to the resistance of the resistors 41, 42 and 100 V, allowing the potential of the capacitor 32 to rise substantially linearly (generating a ramp voltage).

The potential of the capacitor 32 is applied to an inverting input (−) of a comparator 51 in a compare circuit 50. A reference voltage Ref of a given level is applied to a non-inverting input (+) of the comparator 51, which inverts its output from a high level H to a low level L (interrupt command signal) when the voltage across the capacitor 32 reaches or exceeds the reference voltage Ref. This low level L provides a low level L to the non-inverting input (+) of the comparator 51 through diodes 52, 53, whereby comparator 51 continues its low level L output. Since the output from the comparator 51 is at L, the capacitor 32 in the peak hold circuit 30 begins to discharge through a resistor 55 and a diode 54. Additionally, the output L from the comparator 50 produces an output c from the inverter 82 which is at H (interrupt signal) which in turn turns the ignition driver 91 off to interrupt the current flow through the primary coil of the ignition transformer IG1, thereby inducing a high voltage across the secondary coil to produce sparks across a spark plug SP1. At a given time delay after the signal c changes to H, the output from the inverter 73 in the reset circuit 70 is reversed from H to L to turn the transistor 74 off, but the capacitor 32 in the peak hold circuit 30 fails to be charged since there is no current flow through the primary coil at this time. Since the anode 43 of the diode 43 in the ramp voltage generator 40 assumes a low level L, the capacitor 32 also fails to be charged by the ramp voltage generator 40.

On the other hand, when the output from the comparator 51 switches from H to L in a manner mentioned above, a potential at a non-inverting input (+) of a comparator 64 in a discharge period determining circuit 60 falls from H to L, whereby the output from the comparator 64 is reversed from H to L. A capacitor 61 begins to be charged through a resistor 62, gradually raising its potential. The potential of the capacitor 61 is applied to the non-inverting input (+) of the comparator 64, while a given potential is applied to an inverting input (−) thereof. At a time interval Ts after a switching of the output from the comparator 51 from H to L in a manner mentioned above, the potential of the capacitor 61 (the potential at the non-inverting input (+)) becomes equal to or exceeds the potential at the inverting input (−), whereby the output from the comparator 64 is reversed from L to H. However, it is to be noted that within a time interval less than Ts, the capacitor 32 in the peak hold circuit 30 is discharged, and its potential (anode potential of diode 54) will be lower than the potential at the non-inverting input (+) of the comparator 51 (anode potential of diode 52), whereby the output from the comparator 51 reverts to H. Accordingly, when the output from the comparator 64 is reversed from L to H in a manner mentioned above, it follows that the both outputs from the comparators 51 and 64 will be at H, so that the potential of the capacitor 61 will be raised by an amount corresponding to H, and discharges to 5 V line through diode 63. However, the potential at the non-inverting input (+) of the comparator 64 remains at H (5 V), and hence the comparator 64 continues its H output. Since the outputs from both comparators 51 and 64 are at H, it will be seen that if the ignition timing signal a continues to be at H, the output c from the inverter 82 will be reversed from H (interrupt signal) to L (conduction signal) to render FET91c of the ignition driver 91 conductive, passing a current through the primary coil of the ignition coil IG1, whereby sparks across the spark plug SP1 cease.

As long as the ignition timing signal a remains at H, the energization and the interruption thereof of the primary coil in the manner mentioned above will be repeated alternately. When the ignition timing signal a is reversed from H to L, an input to the inverter 82 will be L, whereby its output c will be at H (interrupt signal), interrupting the energization of the primary coil. In addition, the output from the comparator 64 in the discharge period determining circuit will be also reversed to L. If the output from the comparator 64 resumes H condition at Ts thereafter, the fact that the ignition timing signal line remains at L prevents the potential at the output of the comparator 64 or at the input of the inverter 82 from reverting to H, and hence the ignition driver 91 is maintained off.

A primary coil current during a first pass after the switching of the ignition timing signal a from L (interrupt command) to H (supply command) will be retarded in its level rise inasmuch as there is no residual current through the primary coil of the ignition coil IG1, and hence a primary coil energization time interval $t_0$ will be relatively long as shown in FIG. 2. However, during a second and a subsequent pass, the primary coil current will be rapid in level rise due to the residual current from the sparks of the previous pass, and hence the primary coil energization time intervals $t_1$, $t_2$ will be relatively short. When the residual current is small (meaning that the difference between the charging achieved by the previous energization of the primary coil and the discharge which occurs in terms of sparks is small), the rise of the primary coil current will be retarded as indicated by Ip shown in phantom line in FIG. 2, increasing the primary coil energization time interval $t_1$. Conversely, when the residual current is high, the primary coil current will rise rapidly, and hence the primary coil energization time interval $t_1$ will be shortened as indicated in broken lines. When $t_1$ is longer, the following residual current will be high, reducing the subsequent primary coil energization time interval. The charging time (primary coil energization time interval $t_1$) of the multiple ignition will be automatically made substantially uniform in this manner, thus achieving a substantially fixed multiple ignition period and a constant discharge energy from spark to spark.

As pointed out previously in the description of the prior art, the primary coil current will pulsate as indicated by Ip in FIG. 2, the ramp voltage generator 40 generates a ramp voltage as indicated by an arrow directed to the right and upward and having its base point at the peak value attained during Tc. When it reaches the reference voltage Ref, the energization of the primary coil is interrupted. In this manner, the energization time interval c is prevented from varying largely due to the pulsation, achieving a multiple ignition period and a discharge energy of each individual spark, both of which are stabilized so as to be substantially constant.

FIG. 1 illustrates a manner of controlling a spark energy across a single spark plug SP1 by means of a controller 100, but the controller 100 can similarly control the spark energy of a plurality of spark plugs as well.

Figure 3:
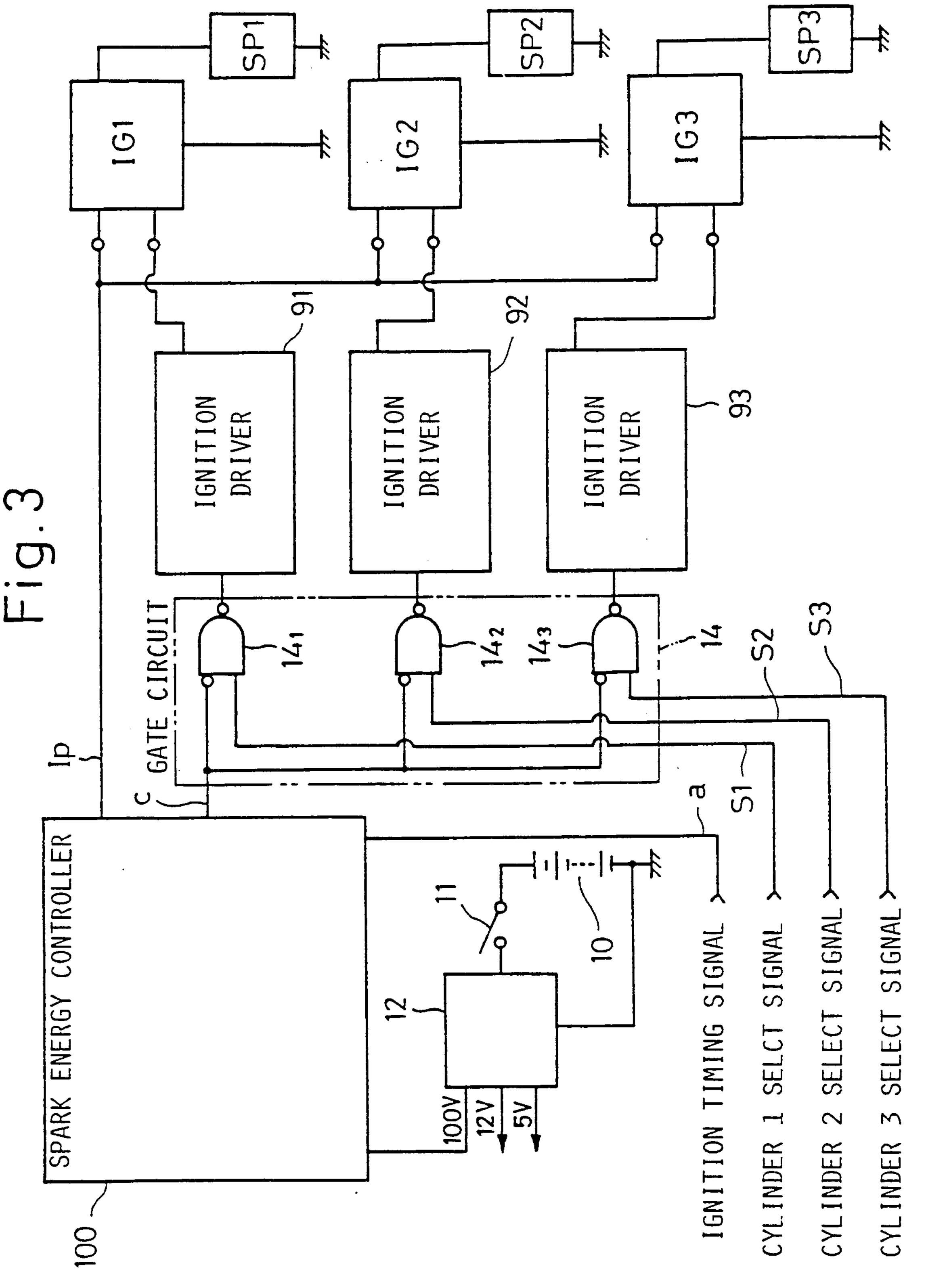
FIG. 3 is a block diagram of another embodiment of the invention.
Figure 4:
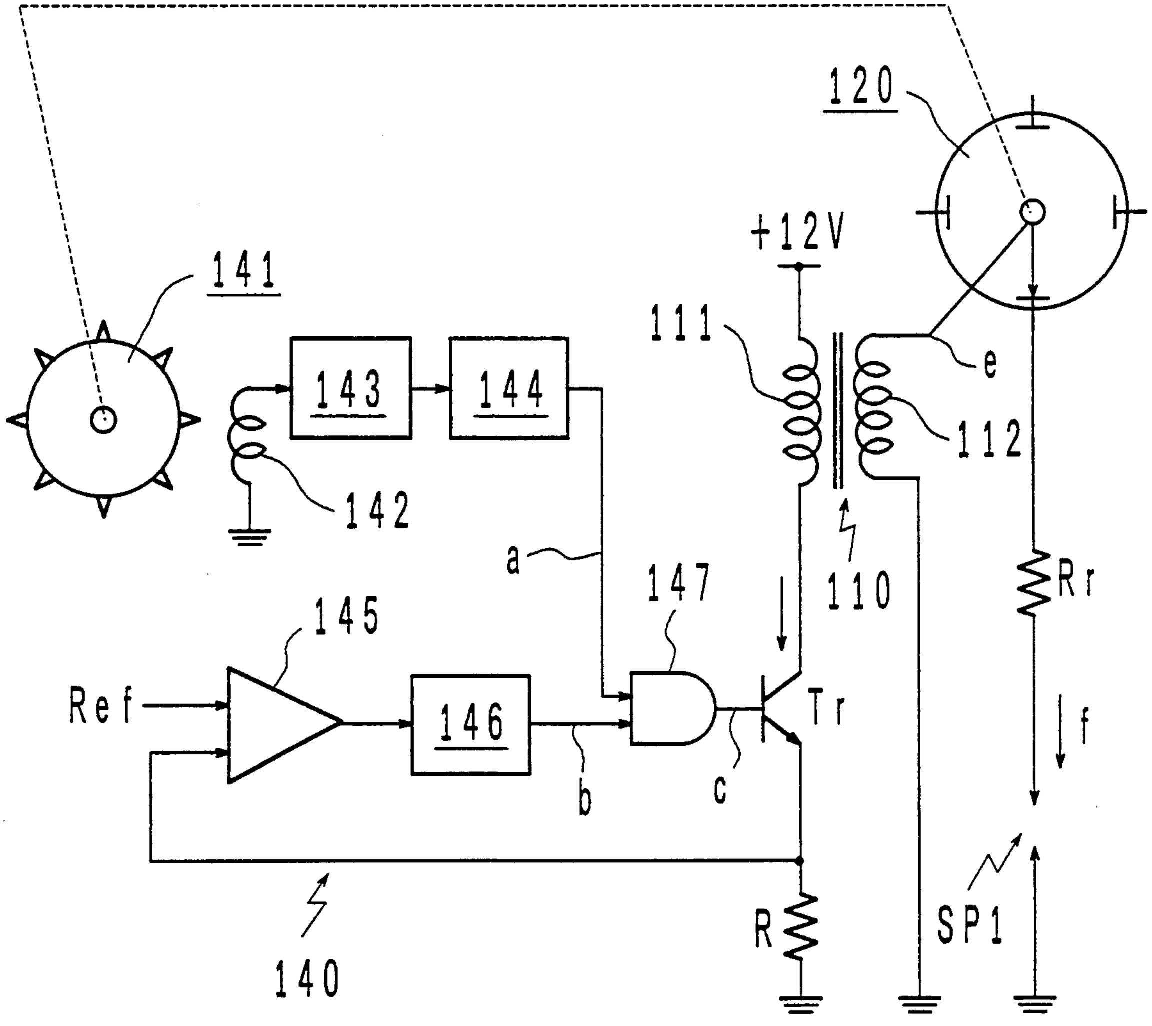
Fig. 4 Prior Art
FIG. 4 is a block diagram of a conventional ignition system.
Figure 5:
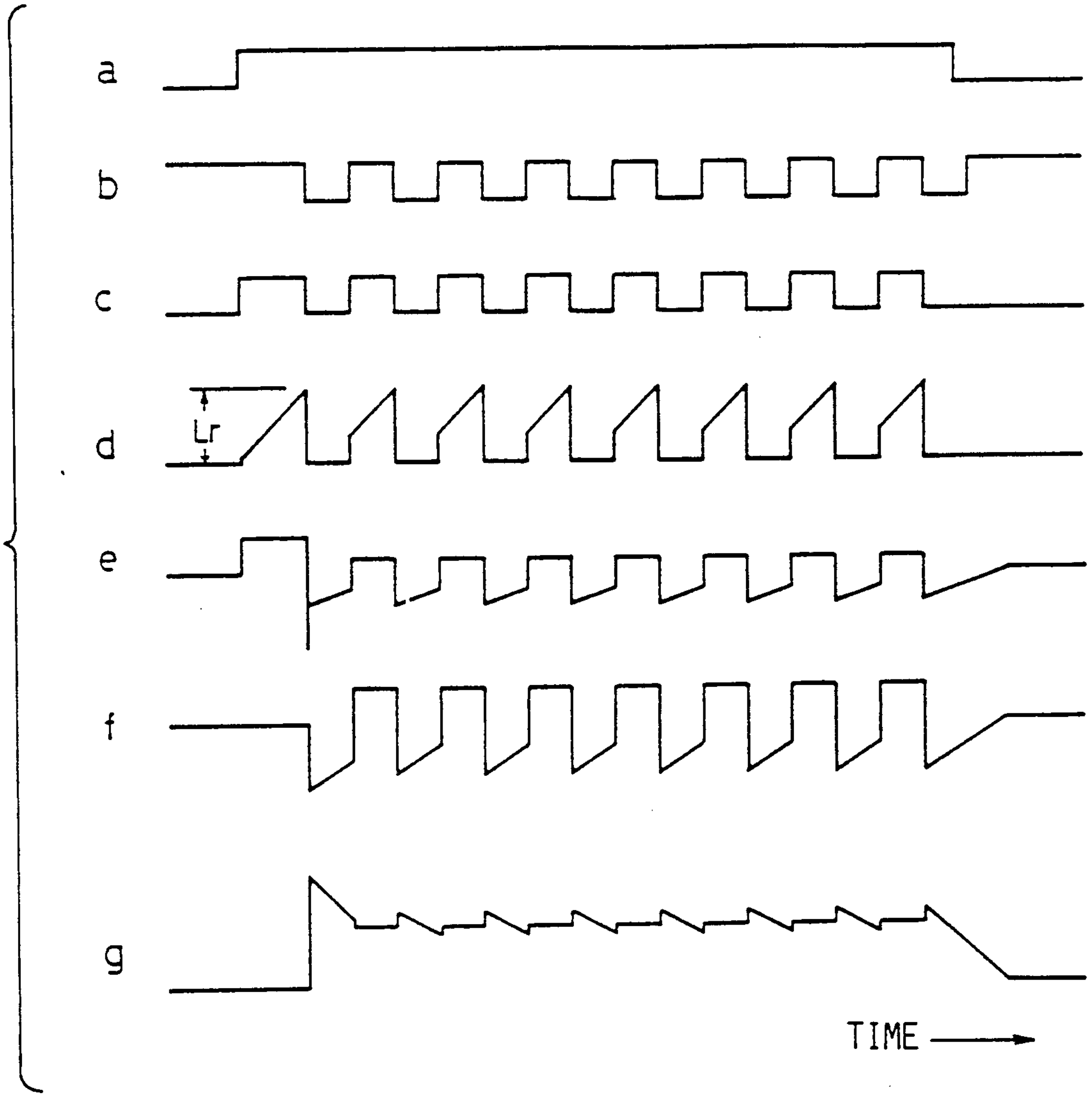
Fig. 5 PRIOR ART
FIGS. 5(*a–g*) are a timing chart showing changes in electrical signals occurring at various points in the electrical circuit shown in FIG. 4 in a time sequence.
Figure 6:
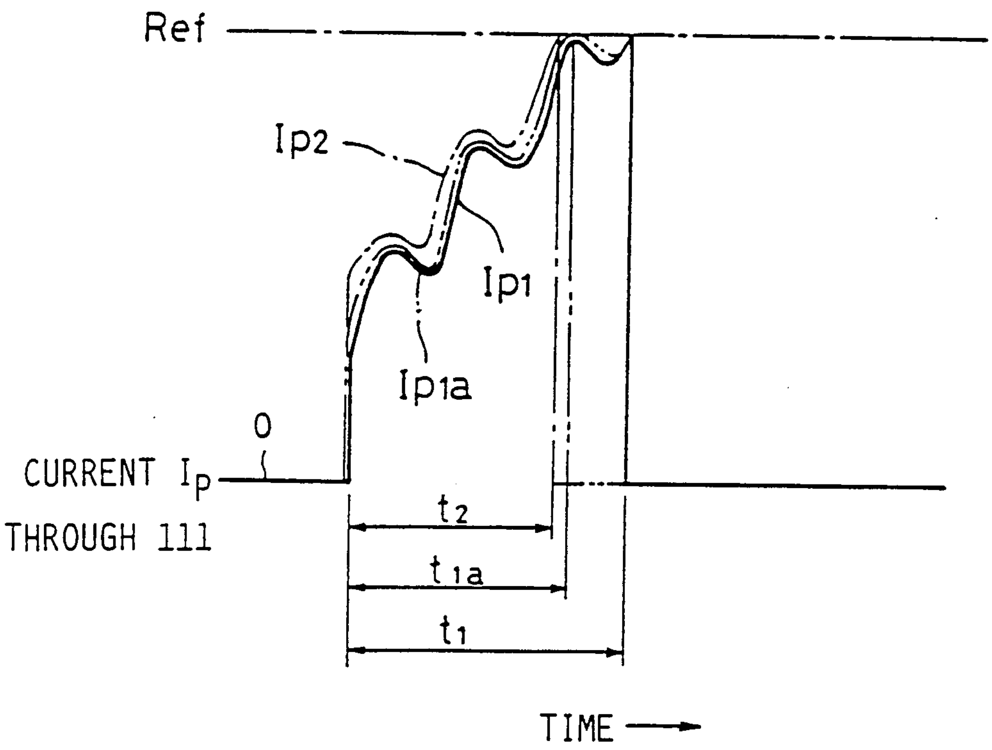
Fig. 6 PRIOR ART
FIG. 6 is a timing chart showing level changes in a current which passes through the primary coil of an ignition coil of an ignition system in a time sequence.

FIG. 3 shows one embodiment in which a single spark energy controller 100 is used to control the spark energy of spark plugs SP1 to SP3 associated with three cylinders. The controller 100 shown in FIG. 3 has an identical construction as that shown in FIG. 1. Ignition drivers 91 to 93 shown in FIG. 3 also have an identical construction as that shown in FIG. 1. A conduction (L)/interrupt (H) signal c from the spark energy controller 100 is applied to NAND gates $\mathbf{14}_1$ to $\mathbf{14}_3$ in a gate circuit 14, and cylinder select signals S1 to S3 are applied to these NAND gates $\mathbf{14}_1$ to $\mathbf{14}_3$ as gate on/off command signals. In this embodiment, signals S1 to S3 are at H during a time interval during which each spark is to be produced across each of the spark plug SP1 to SP3. The signal c is applied to each of the ignition drivers 91 to 93 during such time interval.

As discussed above, the primary coil current of the ignition coil (IG1) pulsates in a manner indicated at Ip in FIG. 2, but the ramp signal generating means 40 generates a signal which rises linearly from a base point defined by the peak value of the primary coil current during a sampling interval (Tc), as shown by an arrow directed to the right and upward in FIG. 2. The energization of the primary coil is interrupted when the signal reaches the preset level (Ref), thus preventing a large variation in the energization time interval (t) which may be caused by the pulsation, thus achieving a multiple ignition period (t+Ts) and the discharge energy of each spark, both of which remain substantially constant.

While preferred embodiments of the invention have been illustrated and described, it is to be understood that there is no intention to limit the invention to the precise constructions disclosed herein and that the right is reserved to all changes and modifications coming within the scope of the invention as defined in the appended claims.

What is claimed is:

1. An ignition control system comprising:

switching means for supplying/interrupting a current through a primary winding of an ignition coil;

supply command means for providing a conduction signal to the switching means as long as an ignition timing signal is at its supply command level and in the absence of an interrupt command signal and for providing an interrupt signal to the switching means in response to an ignition timing signal at its interrupt command level and the interrupt command signal;

primary current detecting means for detecting the current through the primary winding;

peak hold means for detecting the peak value of the detected primary current;

peak value detection command means for commanding the peak hold means to detect a peak value for a given time interval after the occurrence of the conduction signal;

ramp signal generating means for generating an electrical signal which linearly rises from a base point defined by the peak value held in the peak hold means;

compare means for producing an interrupt timing signal when the linearly rising electrical signal reaches a preset level;

and interrupt interval presetting means for delivering the interrupt command signal which commands a preset time interval to be interrupted to the supply command means in response to the interrupt timing signal.

2. An ignition control system comprising:

a plurality of ignition drivers for supplying/interrupting a current through a primary winding of each one of ignition coils;

supply command means for generating a conduction signal as long as an ignition timing signal is at its supply command level and in the absence of an interrupt command signal and for generating an interrupt signal in response to an ignition timing signal at its interrupt command level and the interrupt command signal;

distributing means for providing the conduction signal and the interrupt signal to each one of the ignition drivers selectively responding to a cylinder designating signal;

primary current detecting means for detecting the current through the primary winding;

peak hold means for detecting the peak value of the detected primary current;

peak value detection command means for commanding the peak hold means to detect a peak value for a given time interval after the occurrence of the conduction signal;

ramp signal generating means for generating an electrical signal which linearly rises from a base point defined by the peak value held in the peak hold means;

compare means for producing an interrupt timing signal when the linearly rising electrical signal reaches a preset level;

and interrupt interval presetting means for delivering the interrupt command signal which commands a preset time interval to be interrupted to the supply command means in response to the interrupt timing signal.

* * * * *